United States Patent
Oyama

(10) Patent No.: US 8,385,715 B2
(45) Date of Patent: Feb. 26, 2013

(54) IMAGE PROCESSING APPARATUS, METHOD FOR CONTROLLING THE SAME, AND STORAGE MEDIUM AND PROGRAM USED THEREWITH

(75) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1176 days.

(21) Appl. No.: 11/670,098

(22) Filed: Feb. 1, 2007

(65) Prior Publication Data

US 2007/0189729 A1 Aug. 16, 2007

(30) Foreign Application Priority Data

Feb. 13, 2006 (JP) .................................. 2006-034966
Jan. 12, 2007 (JP) .................................. 2007-004675

(51) Int. Cl.
*H04N 5/77* (2006.01)
*H04N 5/93* (2006.01)

(52) U.S. Cl. ........ 386/224; 386/290; 386/281; 386/287; 386/280; 386/278

(58) Field of Classification Search .................. 386/224, 386/278, 290, 281, 287, 280
See application file for complete search history.

(56) References Cited

U.S. PATENT DOCUMENTS

| 4,591,931 A | * | 5/1986 | Baumeister | .................. 360/72.1 |
| 4,956,725 A | * | 9/1990 | Kozuki et al. | .................. 386/241 |
| 6,618,547 B1 | * | 9/2003 | Peters et al. | .................. 386/201 |
| 6,784,925 B1 | * | 8/2004 | Tomat et al. | ............. 348/207.11 |
| 2002/0110354 A1 | | 8/2002 | Ikeda et al. | |
| 2004/0233301 A1 | | 11/2004 | Nakata et al. | |
| 2005/0062856 A1 | | 3/2005 | Matsushita | |
| 2005/0063585 A1 | | 3/2005 | Matsuura | |
| 2008/0212953 A1 | * | 9/2008 | Nagayama | .................... 386/126 |

FOREIGN PATENT DOCUMENTS

| JP | 2004-023273 A | 1/2004 |
| JP | 2004-254036 A | 9/2004 |
| JP | 2005-311493 A | 11/2005 |
| JP | 2006-084735 A | 3/2006 |

* cited by examiner

*Primary Examiner* — Helen Shibru
(74) *Attorney, Agent, or Firm* — Canon USA Inc. IP Division

(57) ABSTRACT

An image processing apparatus is intended to display an image arbitrarily selected between an original image and an edited image in accordance with a user's preference after image editing. The image processing apparatus is designed so that an image displayed after the image editing can be selected depending on a user's intention. The image processing apparatus specifies and displays an unedited or edited image on the basis of a user operation, whereby the user can easily view a desired image.

10 Claims, 13 Drawing Sheets

IMAGE PROCESSING APPARATUS, METHOD FOR CONTROLLING THE SAME, AND STORAGE MEDIUM AND PROGRAM USED THEREWITH

BACKGROUND OF THE INVENTION

1. Field of the Invention

The present invention relates to a technology for selecting an image to be displayed after image editing finishes in an image processing apparatus.

2. Description of the Related Art

At present, image processing apparatuses and image pickup devices are becoming more sophisticated. As a result, image processing apparatuses have not only a function of simply displaying (playing back) an image recorded on a recording medium or a pickup image (hereinafter simply referred to as an "image") but also a function of editing an image and storing the edited image as a new image.

Image processing apparatuses of the related art include those in which, when the present window is switched to a different window after an image is edited on another window, an unedited image is displayed on the different window, and those that fixedly display either the unedited image or the edited image stored as a new image on the different window. However, there may be cases in which the unedited image should be displayed and in which the edited image should be displayed.

For example, for an image processing apparatus that displays an unedited image after storing an edited image as a new image, it is difficult to find the edited image. In a case such as when a user needs to print an edited image immediately after image editing, the operation is very cumbersome since the user must perform an image feed operation in order to search for the edited image.

Conversely, in an image processing apparatus controlled to display an edited image, it takes a long time to find which one of the stored images is the edited image. For example, when the user performs different types of editing on the same image, a very cumbersome operation is needed since, whenever editing is performed, an image feed operation must be performed in order to search for the unedited image again.

This is particularly apparent in the case of an apparatus (such as a digital camera) that sequentially specifies images in a predetermined order. As described above, adequacy of specifying either of the unedited image or the edited image after image editing changes depending on a user's intention.

SUMMARY OF THE INVENTION

It is a feature of the present invention to solve the conventional problems.

According to an aspect of the present invention, there is provided a digital camera including an image pickup unit configured to pick up an image of an object, a first storage control unit configured to store the image obtained by the image pickup unit in a storage device, an editing unit configured to edit an image stored in the storage device, a second storage control unit configured to store the edited image as a new image in the storage device, and a selecting screen display unit configured to display a selecting screen for selecting which of the edited image and which unedited original image is to be displayed after editing is performed.

This summary of the invention does not necessarily describe all necessary features so that the invention may also be a sub-combination of these described features.

Further features of the present invention will become apparent from the following description of exemplary embodiments with reference to the attached drawings, in which like reference characters designate the same or similar parts throughout the figures thereof.

DESCRIPTION OF THE EMBODIMENTS

Embodiments of the present invention are described with reference to the accompanying drawings. Each embodiment described below will be useful for understanding various concepts such as generic concepts, specific concepts, and more specific concepts of the present invention.

A technical scope of the present invention is defined by the appended claims, and is not limited by each embodiment described below. All combinations of features described in the following embodiments are not always essential for solutions in the present invention.

First Embodiment

Figure 1:
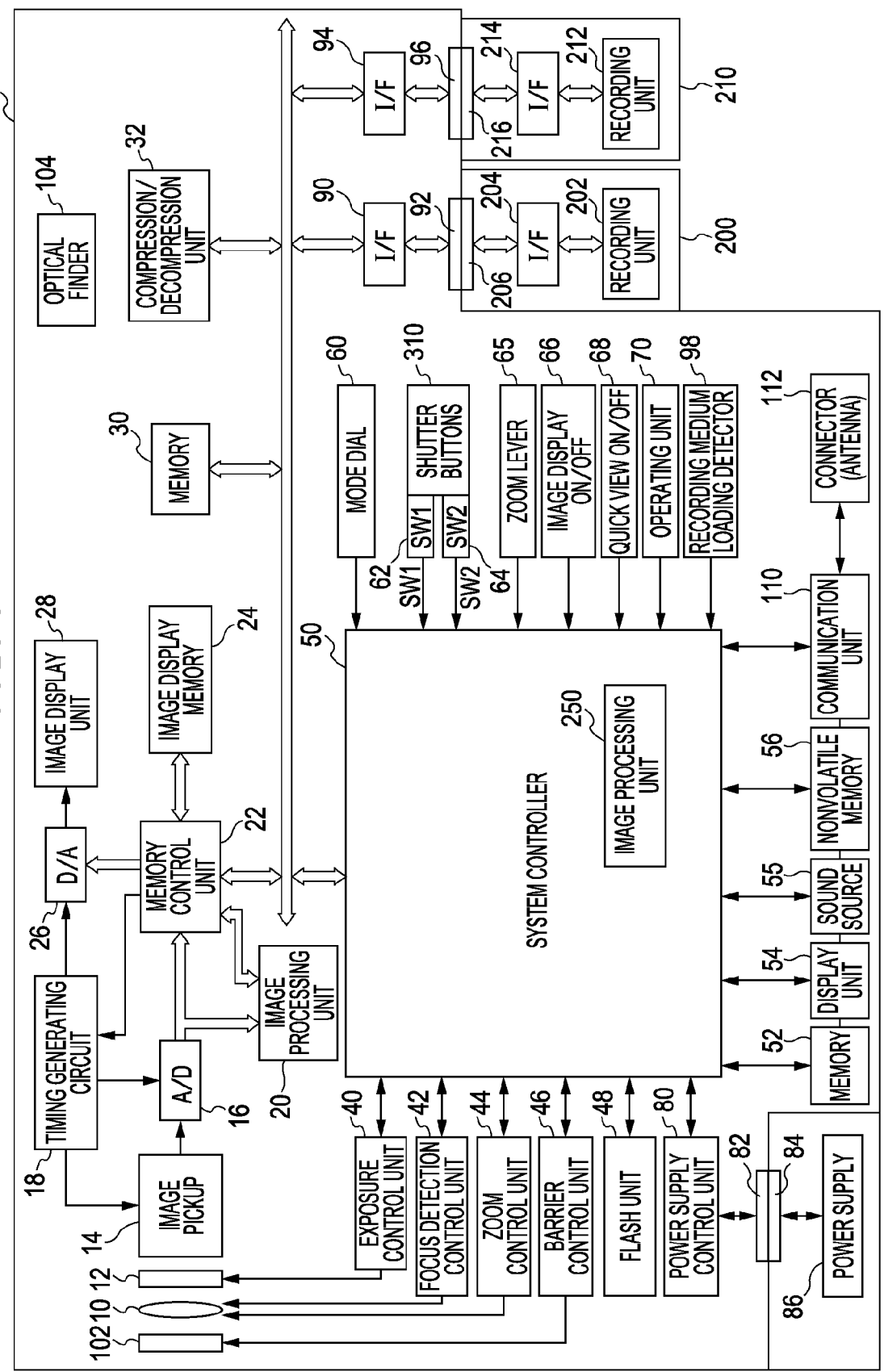
FIG. 1 is a functional block diagram showing the configuration of an image pickup apparatus according to a first embodiment.

FIG. 1 is a functional block diagram showing an image pickup apparatus 100 in which an image processing apparatus to which the present invention is applicable and an image pickup unit. Although, in a description of a first embodiment of the present invention, the present invention is applied to the image pickup apparatus 100, the present invention is also applicable to image display apparatuses including no image pickup functions, such as a personal computer, a cellular phone, a PDA (personal digital assistant), and an image viewer. This is because the present invention has a feature for selecting an image to be displayed from among a plurality of image data items.

Types of image pickup apparatus 100 according to the first embodiment include digital cameras that record digital image data in digital storage media (e.g., memory media such as an EEPROM (electronically erasable and programmable read only memory) and a hard disk). The digital cameras include, for example, a digital movie camera, a digital still camera, and a combination of the digital movie camera and the digital still camera.

The image pickup apparatus 100 is configured to capture an object image through an optical system 10 (image pickup lens unit). The optical system 10 can be formed by using a zoom lens (lens capable of changing an angle of image pickup field). This can provide an optical zoom function (so-called "optical zooming") to the image pickup apparatus 100.

By using an image pickup element 14, the image pickup apparatus 100 can be also configured to have an electronic zoom function (so-called "electronic zooming") that electronically trims a portion from a pickup image.

The image pickup apparatus 100 may be configured to have only one of the optical zooming and the electronic zooming. The optical system 10 may be interchangeable. In this case, by sending an electric signal from a zoom control unit 44 to the optical system 10 in the image pickup apparatus 100, the zooming function can be realized such that a driving mechanism in the optical system 10 drives a variable power lens. Alternatively, the image pickup apparatus 100 may include a driving mechanism for mechanically driving the variable power lens in the optical system 10.

Rays of light (incident from within an optical angle of field) that pass from the object through the optical system 10 form an optical image of the object on an image pickup plane of the image pickup element 14 through an opening of a shutter 12 having an aperture function. As the image pickup element 14, for example, a CCD sensor, a CMOS sensor, or the like, may be used. The image pickup element 14 converts the optical image into an electrical analog image signal and outputs the analog image signal.

An A/D (analog-to-digital) converter 16 (indicated by A/D in FIG. 1) converts the analog image signal output from the image pickup element 14 into a digital image signal.

The image pickup element 14 and the A/D converter 16 are controlled by a clock signal and control signal supplied from the timing generating circuit 18. The timing generating circuit 18 is controlled by the memory control unit 22 and the system controller 50.

The image processing unit 20 performs image processing, such as pixel interpolation and color conversion, on image data (the digital image signal) supplied from the A/D converter 16 or image data supplied from the memory control unit 22. In addition, on the basis of image data obtained by the image pickup unit 14, the image processing unit 20 calculates data for TTL (through-the-lens) AF (auto-focus) processing, AE (auto-exposure) processing, and EF (electronic flash pre-emission) processing. The image processing unit 20 supplies the calculated data to the system controller 50.

On the basis of the calculated data, the system controller 50 controls the exposure control unit 40 and the focus detection control unit 42 (AF control unit), whereby auto-exposure and auto-focus functions are realized. In addition, the image processing unit 20 executes TTL AWB (auto-white-balance) processing on the basis of the image data obtained by the image pickup element 14.

The memory control unit 22 controls the A/D converter 16, the timing generating circuit 18, the image processing unit 20, the image display memory 24, and a D/A (digital-to-analog) converter 26, a memory 30, and a compression/decompression unit 32.

The image data output from the A/D converter 16 is written into the image display memory 24 or the memory 30 through the image processing circuit 20 and the memory control circuit 22, or through the memory control circuit 22 without passing through the image processing circuit 20.

The image data written for display in the image display memory 24 is converted by the D/A converter 26 into an analog image signal for display, and the analog image signal is supplied to the image display unit 28. This displays a pickup image on an image display unit 28. By continuously displaying pickup images on the image display unit 28, an EVF (electronic view finder) function can be realized. The image display unit 28 for displaying images can be arbitrarily switched on and off on the basis of a command from the system controller 50. By using the image pickup apparatus 100 in a state with the image display unit 28 switched off, the power consumption of the image pickup apparatus 100 can be reduced.

The memory 30 is used to store still images and moving images (picked up as images to be stored on a storage medium) obtained in image pickup. The capacity and access speeds (write speed, read speed) of the memory 30 can be arbitrarily set. However, in order to enable continuous image pickup in which a plurality of still images are continuously picked up, or panoramic image pickup, the memory 30 needs to have a memory capacity and access speeds that match this use. The memory 30 is usable as a work area for the system controller 50.

The compression/decompression circuit 32 compresses or decompresses image data by using, for example, adaptive discrete cosine transformation (ADCT). The compression/decompression circuit 32 can read and process (compress/decompress) image data stored in the memory 30, and can write the processed image data into the memory 30.

On the basis of information supplied from the system controller 50, the exposure control unit 40 controls the shutter 12 having the aperture function. The exposure control unit 40 can have a flash light control function associated with the flash 48 (light-emitting device). The flash 48 has a flash light control unit and an AF auxiliary light projection function.

The focus detection control unit 42 controls a focusing lens of the optical system 10 on the basis of information supplied from the system controller 50.

The zoom control unit 44 controls zooming performed by the optical system 10.

A barrier control unit 46 controls the operation of a barrier 102 for protecting the optical system 10.

The system controller 50 is configured so as to control the entirety of the image pickup apparatus 100. The system controller 50 includes an image processing unit 250 for executing displaying of at least one of image pickup conditions to be displayed on the image display unit 28 and an object (representation) indicating the state of the image pickup apparatus 100.

A memory 52 stores constants, variables, and programs that are necessary for the operation of the system controller 50, and, in addition, object data for displaying an object on the image display unit 28, etc. Differently from the case of image data generated in image pickup, the object data is stored in a memory area different from a memory area for temporarily storing image data. The object data is typically written in the memory 52 before the image pickup apparatus 100 is shipped. After the image pickup apparatus 100 is shipped, the object data may be rewritten by a user on the basis of data that is downloaded through a telecommunication line or data that is provided to the user in a form with the data stored in a storage medium, or may be rewritten at a service center or the like.

The display unit 54 is formed by, for example, an LCD (liquid crystal display) or LED (light-emitting diode), and the sound source 55 is formed by, for example, a speaker. Each of the display unit 54 and the sound source 55 includes one or a plurality of elements, and is configured to output an operating state, a message, or the like by using characters, an image, sound, or the like, in response to execution of a program by the system controller 50. The display unit 54 and the sound source 55 are disposed at appropriate positions. A part of the elements of the display unit 54 can be disposed within the optical finder 104.

The information displayed by the display unit 54 may include, for example, single/continuous shooting indication, a self-timer, a compression rate, the number of pixels for recording, the number of recorded images, and the number of remaining images to be picked up, and a shutter speed. The displayed information also may include an aperture value, exposure correction indication, flash indication, red eye weakening indication, macro image pickup indication, and buzzer setting indication, clock's remaining battery power indication, remaining battery power indication, an error, and information by a numeral having a plurality of digits, etc. The displayed information further includes loading states of the storage media 200 and 210, communication interface operation indication, and a date and time.

Among the pieces of information displayed on the display unit 54, information displayed in the optical finder 104 includes, for example, in-focus indication, an image instability alert, flash charging indication, a shutter speed, an aperture value, and exposure correction indication.

A nonvolatile memory 56 is a memory, such as an EEPROM (electronically erasable and programmable read only memory), in which data can electrically be erased or recorded. The object data may be stored in the nonvolatile memory 56.

A mode dial 60 is used to set (switch) the state of the image pickup apparatus 100 to an "image pickup mode", a "playback mode", a "connection-to-PC (personal computer) mode", etc.

A first shutter switch 62 (SW1) is turned on in the middle of operating (halfway pressing) a shutter button 310 to instruct the system controller 50 to initiate AF processing, AE processing, AWB processing, EF processing, or the like.

A second shutter switch 64 (SW2) is turned on at the completion of operating (fully pressing) the shutter button 310. The second shutter switch 64 (SW2) instructs the system controller 50 to initiate processing in which, after an image signal is read from the image pickup element 14 and converted into digital image data by the A/D converter 16, the digital image data is processed by the image processing unit 20 before being written in the memory 30 through the memory control unit 22. The second shutter switch 64 (SW2) instructs the system controller 50 to initiate consecutive processes including processing in which, after image data is read from the memory 30 and compressed by the memory 30, the compressed image data is written in a storage medium 200 or 210.

A zoom operation unit 65 is operated by a user (photographer) in order to change the angle of view (zoom factor or image pickup magnification) for image capture. The zoom operation unit 65 can include a slide operating member or a lever operating member, and a switch or sensor for detecting an operation on the operating member.

Figure 2:
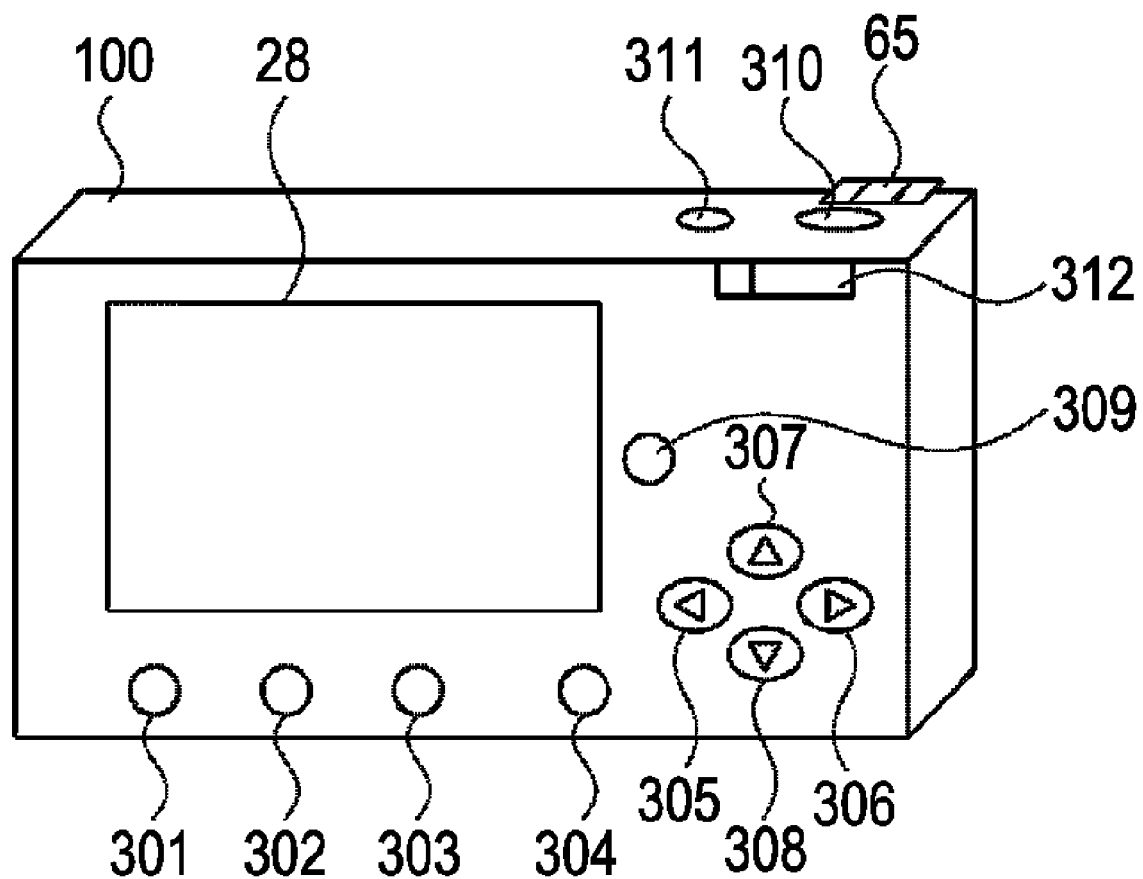
FIG. 2 is an exterior view of the image pickup apparatus according to the first embodiment.

An operating unit 70 includes the buttons or switches 301 to 311 shown in FIG. 2. The operating unit 70 is used to perform operations such as switching on and off of main power, setting or altering image pickup conditions, confirming the state of the image pickup apparatus 100, and confirming images picked up.

A power supply control unit 80 includes, for example, a power detecting circuit, a DC-DC converter, and a switch circuit for switching between blocks to be supplied with power. The power supply control unit 80 detects whether there is a power supply, and detects a power supply type and a remaining battery level. On the basis of the result of the detection and a command from the system controller 50, the power supply control unit 80 controls the DC-DC converter to supply a necessary voltage to each block in a necessary period. The image pickup apparatus 100 and the power supply control unit 80 include connectors 82 and 84, respectively, and are connected to each other by the connectors 82 and 84. The power supply 86 is, for example, a primary battery such as an alkaline battery or a lithium battery, a secondary battery such as a NiCd battery, a NIMH battery, or a Li battery, or an AC adapter.

The storage media 200 and 210 are connected to connectors 92 and 96 of the image pickup apparatus 100, respectively. The storage media 200 and 210 include, for example, recording units 202 and 212 such as semiconductor memories or hard disks, and interfaces (each indicated by "I/F") 204 and 214, respectively. The storage media 200 and 210 are connected to a bus of the image pickup apparatus 100 via interfaces 90 and 94 of the image pickup apparatus 100. A storage medium loading detector 98 detects whether the storage media 200 and 210 are respectively connected to the connectors 92 and 96.

Although, in the description of the first embodiment, two systems of interfaces and connectors for recording media are used, the number of systems of interfaces and connectors may be one and may be three or more. In the case of a plural number of systems of interfaces and connectors, the systems may have different types of specifications. As the interfaces and the connectors, for example, those that comply with PCMCIA (Personal Computer Memory Card International Association) card and CF (Compact Flash) card specifications can be employed.

When those complying with PCMCIA card and CF (Compact Flash) card specifications are employed as the interfaces 90 and 94 and as the connectors 92 and 96, image data and management information associated with the image data can be mutually transferred between the image pickup apparatus 100 and an external device by using the following cards, etc. The cards are various types of communication cards such as a LAN (local area network) card, a USB (Universal Serial Bus) card, an IEEE (Institute of Electrical and Electronic Engineers) 1394 card, a P1284 card, a SCSI (small computer system interface) card, and a PHS (personal handyphone system) card. In addition, a peripheral device, such as a computer or a printer, may be used as the external device.

The optical finder 104 enables implementation of image pickup without using the EVF function of the image display unit 28. In the optical finder 104, display elements included in the display unit 54 can be disposed. The display elements may include, for example, one or more of an in-focus display element, an image instability alert display element, a flash charging display element, a shutter speed display element, an aperture value display element, and an exposure correction display element.

A communication interface 110 provides various communication functions such as USB, IEEE 1394, P1294, SCSI, a modem, LAN, RS232C, and wireless communication. The communication unit 110 can connect to a connector 112 for connecting the image pickup apparatus 100 to a different device, or to an antenna when the communication unit 110 provides a wireless communication function.

FIG. 2 shows an example of an exterior configuration of the image pickup apparatus 100. In FIG. 2, components that are unnecessary for description are not shown.

A menu button 301 is used to display a menu for setting various types of image pickup conditions and displaying the state of the image pickup apparatus 100. The menu is formed so as to include at least one of a plurality of selectable items and items whose values can be changed.

A determination button 302 is used to determine or select a value or item on the menu. When the determination button 302 is pressed, the system controller 50 determines or selects a value or item selected that time.

A display button 303 is used to select between displaying and hiding of each image picked up, and to select whether to allow the image display unit 28 to function as an EVF.

A set button 304 is used to switch each of various menu screens to a menu screen for setting more specific conditions.

Direction buttons 305 to 308 are used to change an option (e.g., an item or image) selected from among a plurality of options, the option being designated with a cursor or in highlighted form. The direction buttons 305 to 308 are also used to change the position of an index (for example, a pointer displayed on the screen) for specifying the selected option. The direction buttons 305 to 308 can also be used to increase or decrease numerical values (e.g., numerical values representing a correcting value and a date and time). In the present invention, the direction buttons 305 to 308 are used to select an image effect candidate in the case of image editing.

A print button 309 is used to output a pickup image to a printer (not shown) connected in wired or wireless manner via the connector 112.

A power supply button 311 is used to activate and stop the image pickup apparatus 100 or to switch on and off the main power of the image pickup apparatus 100.

By using a mode lever 312, the image pickup apparatus 100 can switch between the "image pickup mode" for picking up images and an image viewing mode for playing back images. By using the mode lever 312, during the image viewing mode, an arbitrary image can be edited.

Image editing and display process of the image pickup apparatus 100 are described below with reference to FIG. 3.

Figure 3:
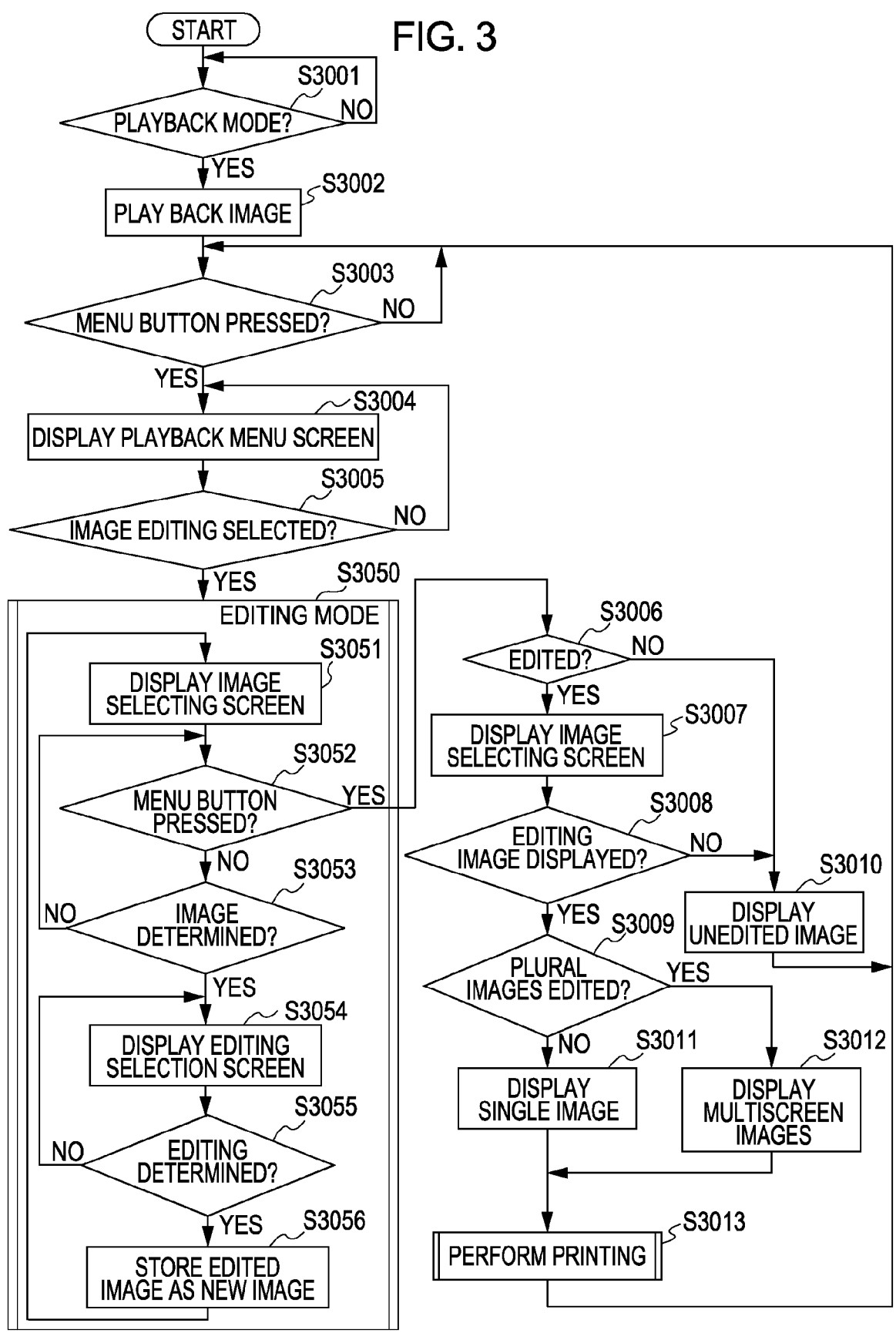
FIG. 3 is a flowchart showing a process including image editing, and image (to be displayed) selection after an image editing mode finishes.

FIG. 3 is a flowchart showing a process including image selection for display and automatic playback. FIG. 3 shows an embodiment in which, when the image pickup apparatus 100 returns to the image viewing mode after finishing consecutive image editing, a display image to be displayed is selected. In response to a user's operation, this process is finished when the image pickup apparatus 100 switches to the image pickup mode or the main power is turned off.

In step S3001, by checking the state of the mode lever 312, the system controller 50 judges whether the present mode is the playback mode.

If the system controller 50 has judged that the present mode is the playback mode, the system controller 50 proceeds to step S3002. If the system controller 50 has judged that the present mode is not the playback mode, the system controller 50 repeats processing until the system controller 50 switches to the playback mode.

Figure 21:
FIG. 21 is an illustration of an example of a played back image in the first embodiment.

In step S3002, the system controller 50 specifies an image having last order of specification, reads the specified image from the storage medium 200, and displays the read image on the image display unit 28. The image specifying order is predetermined. In this embodiment, the image specifying order is order of sorting images stored in the storage medium 200 by file name. Whenever the direction button 305 or 306 is pressed by the user, the system controller 50 specifies, from the images stored in the storage medium 200, an image having image specifying order adjacent to a presently specified image, and displays the specified image on the image display unit 28. So-called "image feeding" is performed. FIG. 21 shows an example of the image displayed in step S3002. Obviously, instead of only displaying one image on one screen, the system controller 50 may display a plurality of images on one screen. In this case, among the plurality of images displayed, for example, by emphasizing the specified image, the specified image can be displayed so as to be distinguished from the other images.

In step S3003, the system controller 50 judges whether the menu button 301 has been pressed. If the system controller 50 has judged that the menu button 301 has been pressed, the system controller 50 proceeds to step S3004. If the menu button 301 has not been pressed, the system controller 50 repeats step S3003 until the menu button 301 is pressed.

Figure 6:
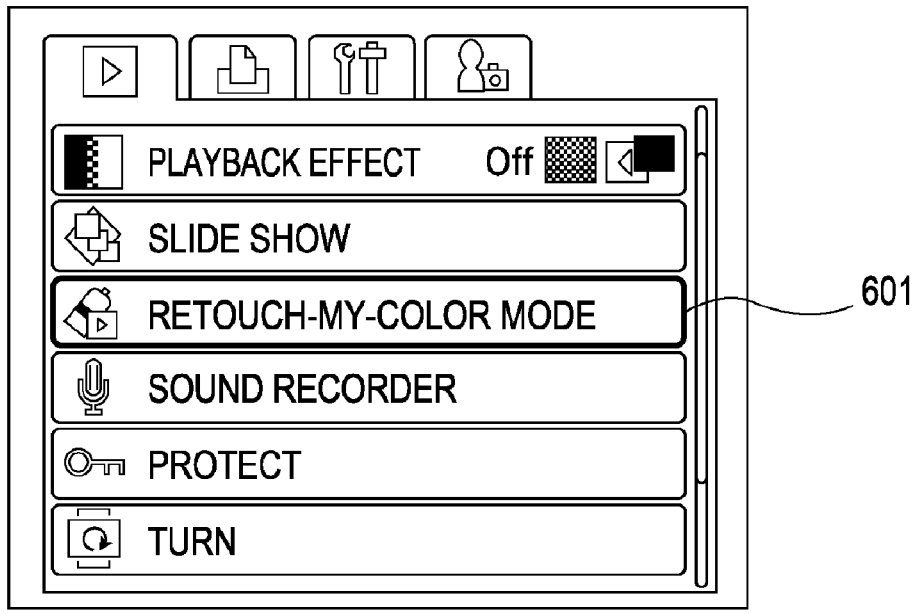
FIG. 6 is an illustration of an example of a menu screen in the first embodiment.

In step S3004, the system controller 50 displays a playback menu screen on the image display unit 28. The playback menu screen is shown in FIG. 6. The playback menu includes a retouch-my-color mode 601, which is described later.

In step S3005, the system controller 50 judges whether the determination button 302 has been pressed with the retouch-my-color mode 601 of the playback menu selected. If the system controller 50 has judged that the determination button 302 has been pressed, the system controller 50 proceeds to step S3051. If the system controller 50 has judged that the determination button 302 has not been pressed, the system controller 50 returns to step S3004.

In steps S3051 through S3056, the system controller 50 is in the image editing mode, and can perform various type of editing on an image. Specifically, by selecting the retouch-my-color mode 601 on the playback menu screen by the user, the image pickup apparatus 100 initiates the image editing mode.

In this embodiment, a retouch-my-color process is described as an example of editing that can be executed in the image editing mode. In the retouch-my-color process, from among a plurality of color change effects prepared, a favorite color effect is selected by the user, whereby the image pickup apparatus 100 provides a color-based effect on an image. The image provided with the color effect is stored as a new different image from the original image.

In step S3051, the system controller 50 displays an image selecting screen on the image display unit 28.

Figure 7:
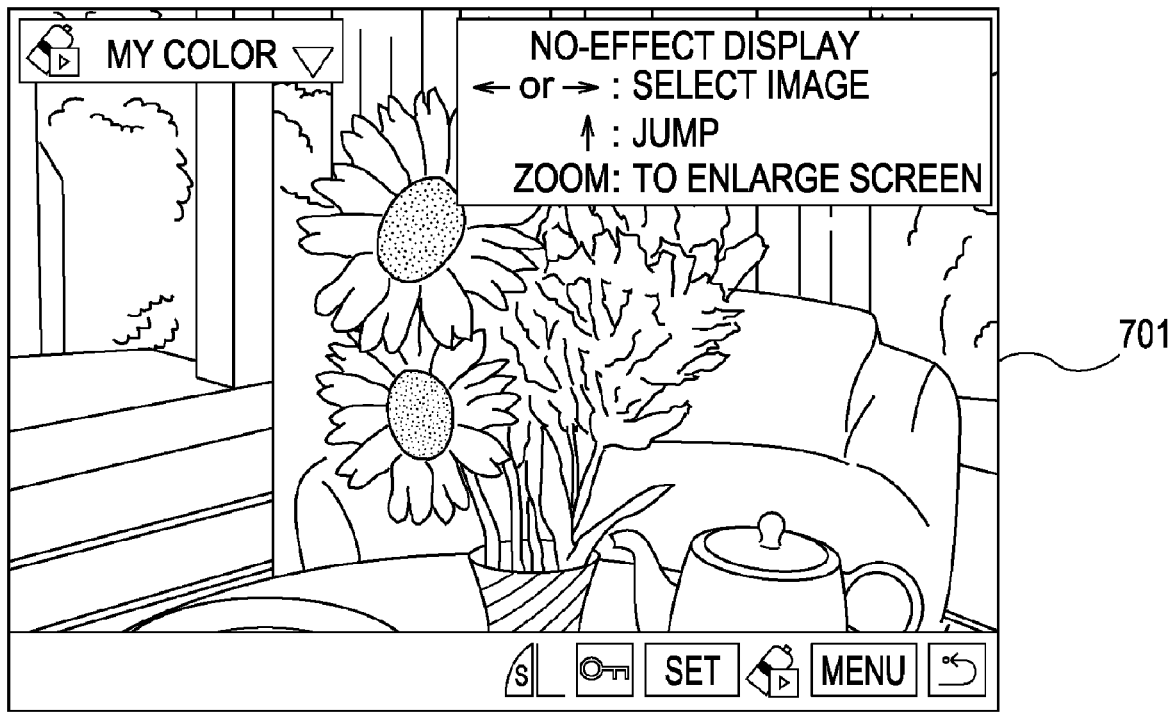
FIG. 7 is an illustration of an example of an image selecting screen in the editing mode in the first embodiment.

The image selecting screen is shown in FIG. 7. The image selecting screen is designated by reference numeral 701 in FIG. 7. Whenever the user presses the direction button 305 or 306, the system controller 50 sequentially specifies images recorded in the recording unit 202 one by one, and displays the images on the image display unit 28.

In step S3052, the system controller 50 judges whether the menu button 301 has been pressed. If the system controller 50 has judged that the menu button 301 has not been pressed, the system controller 50 proceeds to step S3053.

In a state with the image selecting screen displayed, by using the direction buttons 305 and 306 to select an image and pressing the determination button 302, the user can specify an image to be edited. In response to this user's operation, the system controller 50 determines the specified image as an image to be edited.

In step S3053, the system controller 50 judges whether the image to be edited has been determined. If the system controller 50 has judged that the image to be edited has been determined, the system controller 50 proceeds to step S3054. If the system controller 50 has judged that the image to be edited has not been determined, the system controller 50 returns to step S3051.

In step S3054, the system controller 50 displays, on the image display unit 28, an editing selecting screen for allowing the user to select a type of editing on the image.

Figure 8:
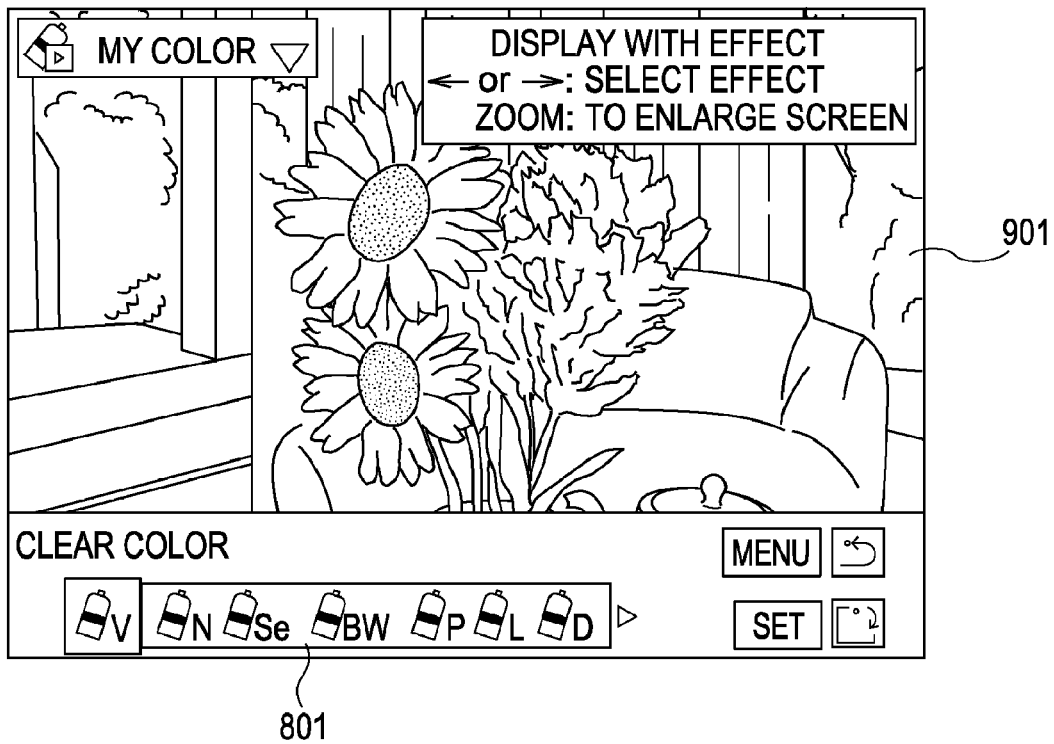
FIG. 8 is an illustration of an example of the image selecting screen in the editing mode in the first embodiment.

The editing selecting screen is shown in FIG. 8. In FIG. 8, by using the direction buttons 305 and 306, the user selects a desired color effect from among a plurality of color effects 801.

After the desired color effect 801 is selected, the system controller 50 uses the image processing unit 250 to add the color effect on the image 701 on the screen of the image display unit 28. At this time, editing has not been fixed yet, so that the edited image is not stored in the storage medium 200.

Figure 9:
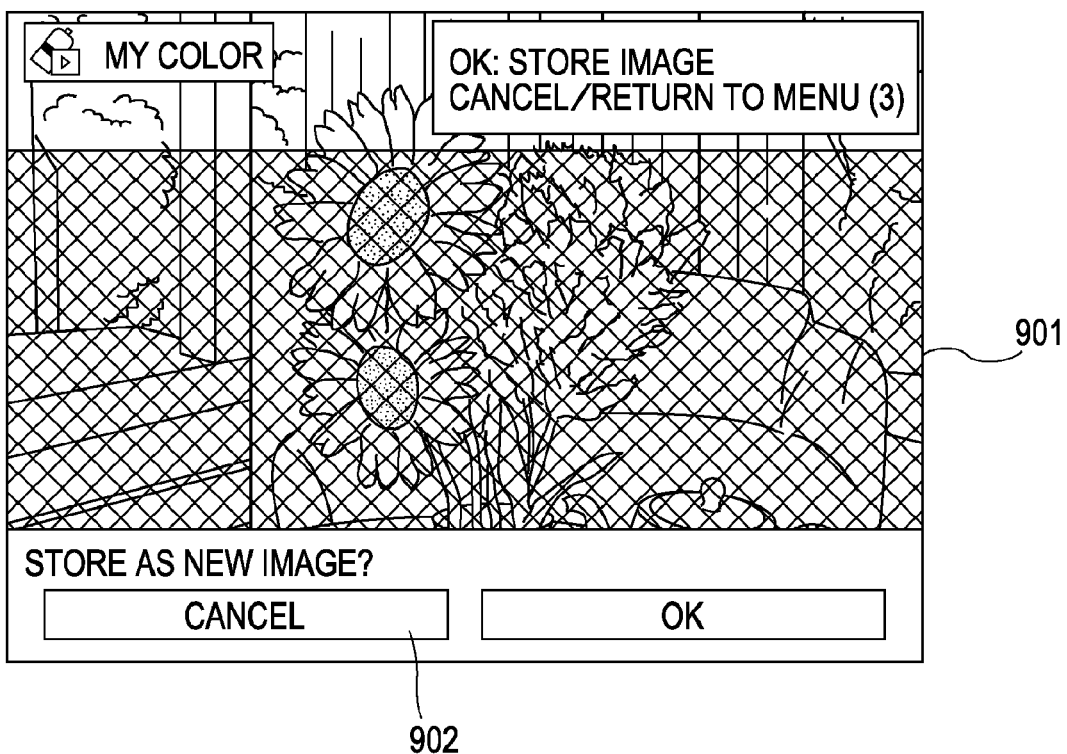
FIG. 9 is an illustration of an example of an edited image in the first embodiment.

By way of example, an image 901 with color effect "sepia" added thereon is shown in FIG. 9. When, in a confirmation dialog 902, "OK" is selected by the user, the system controller 50 fixes the editing, and proceeds to step S3056.

In step S3056, the system controller 50 stores the edited image as a new image in the storage medium 200. At this time, the system controller 50 gives a file name to the new image. In this embodiment, a file name that is not related to the original image prior to editing is given. Normally, file names are given in sequential numbers. Thus, the newly stored image is given the largest number as a file name among the images stored in the storage medium 200. Accordingly, the newly stored image has a last position in image editing order.

After the edited image is stored, the system controller 50 returns to step S3051, and displays the screen shown in FIG. 7 on the image display unit 28.

Subsequently, by repeating steps S3051 through S3056 in response to a user's operation, the system controller 50 performs editing on a plurality of images.

When the menu button 301 is pressed by the user, with the system controller 50 set in the image editing mode (S3050), the system controller 50 skips over the present step and returns to the previous step. When the menu button 301 is pressed in step S3051, the system controller 50 proceeds to step S3006 and finishes the image editing mode (S3050).

In step S3006, the system controller 50 judges whether, in the image editing mode (S3050), image editing has been performed even once. Specifically, the number of files before editing and the number of files after editing are compared, and, when there is a difference in number of files, the system controller 50 judges that image editing has been performed. If the image editing has been performed, the system controller 50 proceeds to step S3007.

Figure 10:
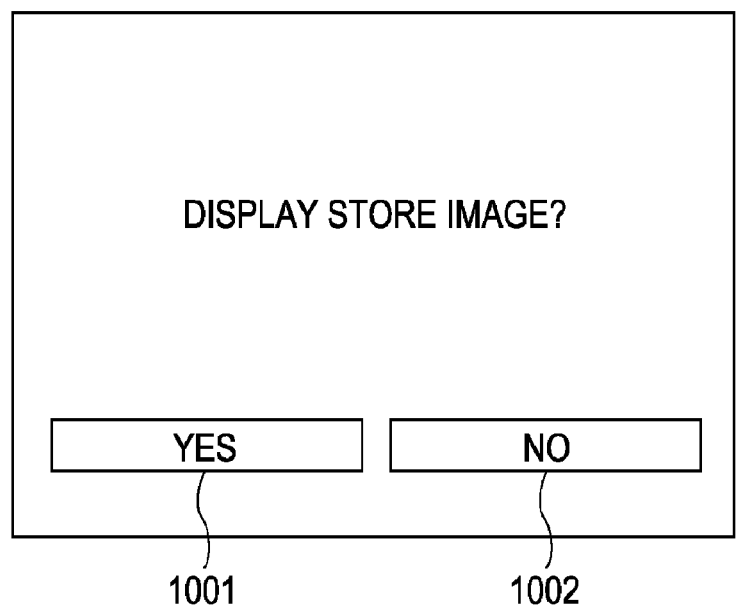
FIG. 10 is an illustration of an example of an image selecting screen in the first embodiment.

In step S3008, the system controller 50 displays the display screen selecting screen on the image display unit 28. The display screen selecting screen is shown in FIG. 10. By selecting a "yes" button 1001 or a "no" button 1002 on this screen, an image to be displayed after the selection can be determined.

In step S3008, the system controller 50 judges whether display of an image to be edited has been selected by the user, that is, whether the "yes" button 1001 on the display screen selecting screen has been selected by the user. If the "yes" button has been selected by the user, the system controller 50 proceeds to step S3009.

In step S3009, the system controller 50 judges whether a plurality of images have been edited in the image editing mode. Specifically, the system controller 50 compares the number of files before editing and the number of files after editing, and, when it is indicated that two or more files increase, the system controller 50 judges that the images have been edited. If the system controller 50 has judged that the images have not been edited, the system controller 50 proceeds to step S3011.

Figure 11:
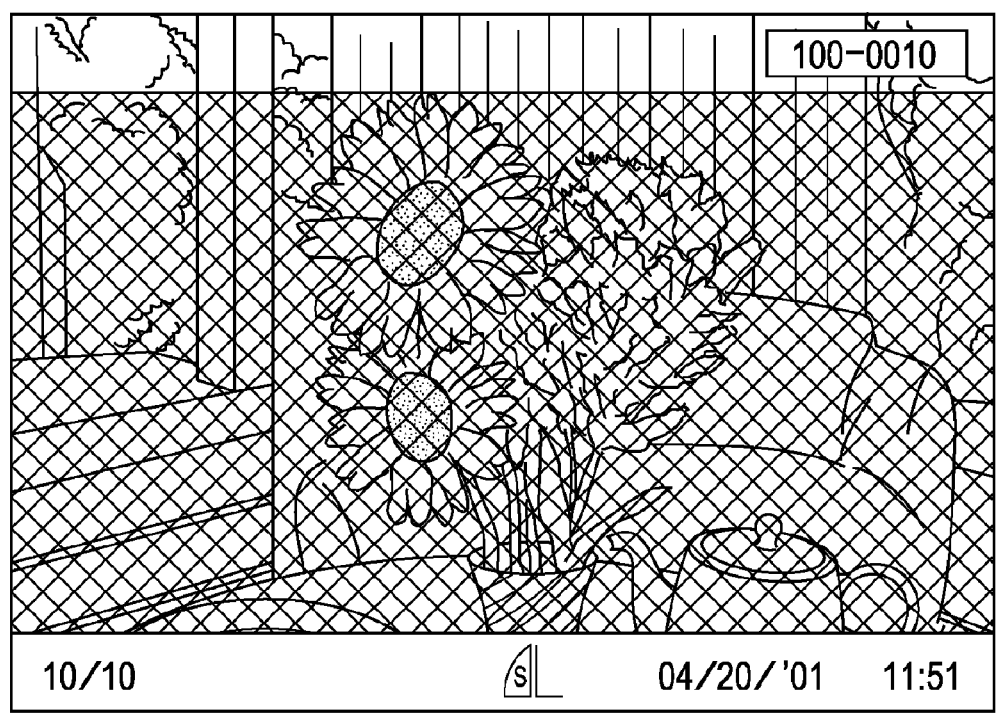
FIG. 11 is an illustration of an example of an edited image in the first embodiment.

In step S3011, the system controller 50 specifies, as a single image displayed after the image editing mode, the newly stored edited image after being edited in the image editing mode, and displays the specified image on the image display unit 28. The image displayed in step S3011 is shown in FIG. 11. When the direction buttons 305 and 306 are pressed with the image (shown in FIG. 11) displayed, image feeding is initiated in order from the edited image.

If, in step S3009, the system controller 50 has judged that the images have been edited, the system controller 50 proceeds to step S3012.

In step S3012, the system controller 50 displays the edited images on the image display unit 28 in multiscreen form. In display in the multiscreen form, a plurality of images are displayed on a single screen, with the images reduced in size. In the multiscreen form in this embodiment, among a series of the edited images, the first set of edited images is specified. The system controller 50 stores, as a counter value, the number of an image file first stored after being edited. After the image editing mode finishes, on the basis of the counter value, the system controller 50 specifies an image to be displayed. Among the images, the first edited image may be specified, and an image to be specified may be determined on the basis of order of sorting file names. After displaying the images in multiscreen form, the system controller 50 proceeds to step S3013.

Figure 12:
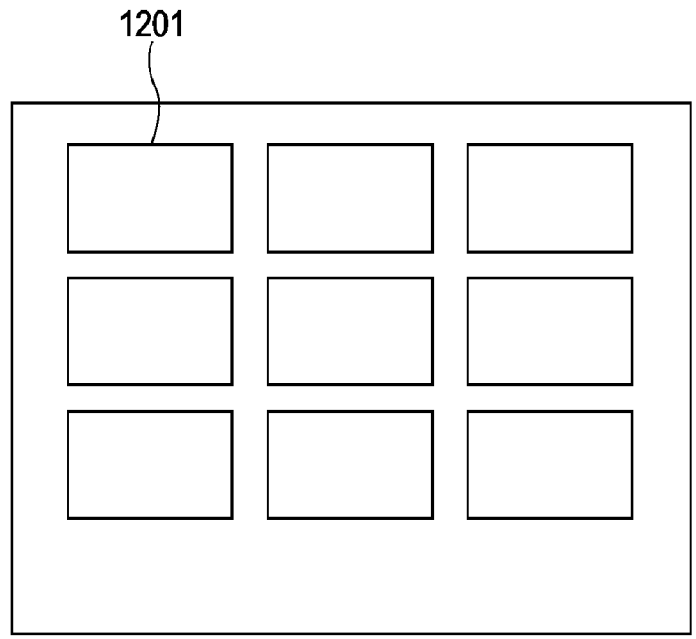
FIG. 12 is an illustration of edited image display in multi-screen form.

FIG. 12 shows an example of images displayed in multiscreen form. In FIG. 12, nine editing images 1201 are displayed on a single screen. By displaying a plurality of edited images in multiscreen form, the user can view a list of images when finishing the image editing mode, thus enhancing visibility. Obviously, if the number of edited images is equal to nine or less, only the nine or less editing images are displayed. When the direction button 305 or 306 is pressed with the screen of FIG. 12 displayed, image feeding is initiated in order from the presently specified image.

If, in step S3008, the display of the edited image has not been selected, that is, if the "no" button 1002 has been selected on the display image selecting screen, the system controller 50 proceeds to step S3010.

In addition, if, in step S3006, it is judged that the image editing has not been performed even once, the system controller 50 proceeds to step S3010.

In step S3010, the system controller 50 specifies the image last displayed in step S3051, that is, an image prior to editing, and displays the specified image on the image display unit 28. When the direction button 305 or 306 is pressed with the image prior to editing displayed, image feeding is initiated in order from the image prior to editing.

In step S3013, printing is performed. The printing is described later. After the printing finishes, the system controller 50 returns to step S3003.

Figure 4:
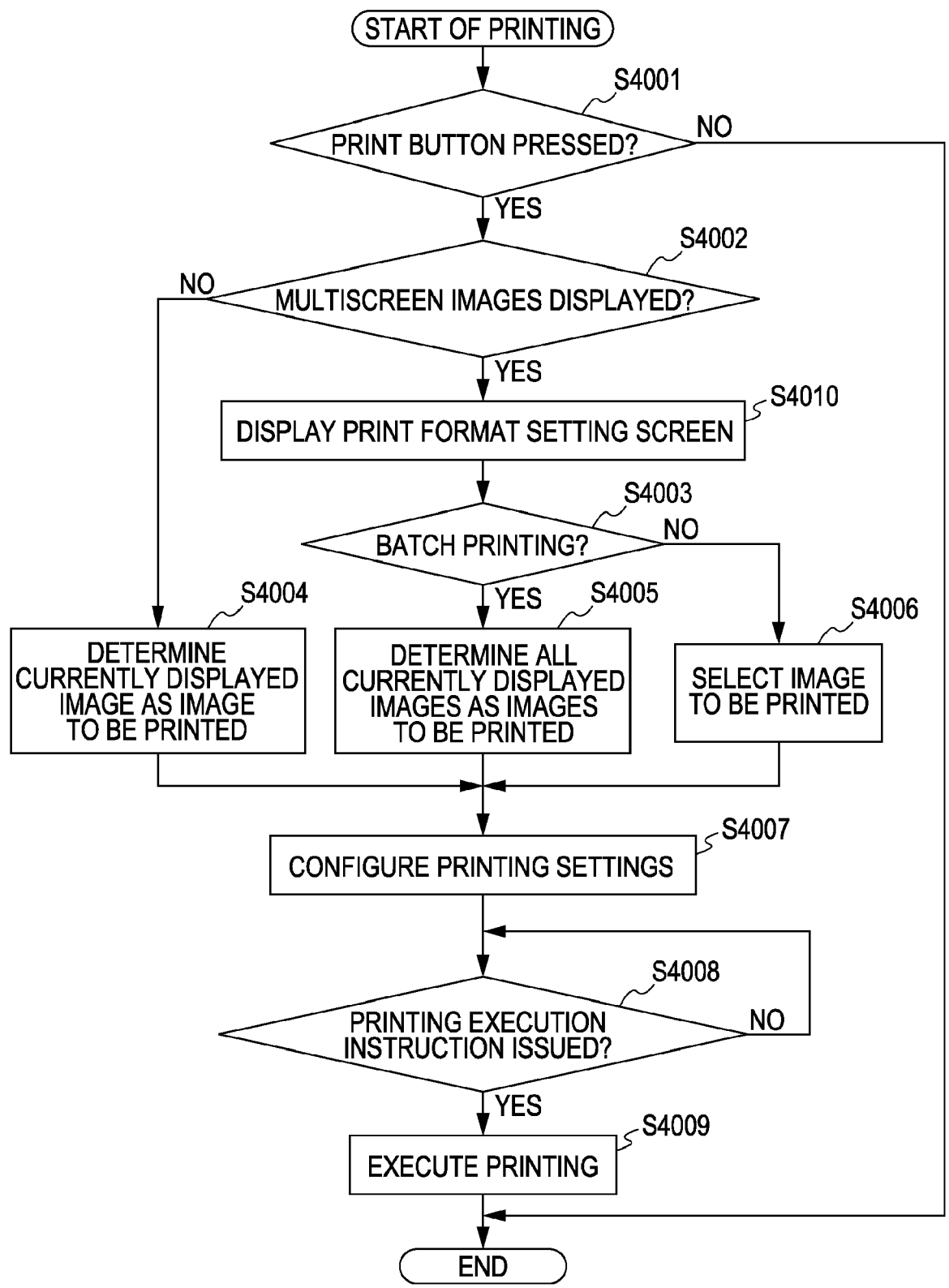
FIG. 4 is a flowchart showing printing.

The printing in step S3013 in this embodiment is specifically described with reference to the flowchart shown in FIG. 4.

In step S4001, the system controller 50 judges whether the print button 309 has been pressed by the user. If the system controller 50 has judged that the print button 309 has been pressed, the system controller 50 proceeds to step S4002. If the system controller 50 has judged that the print button 309 has not been pressed, the printing finishes and the process returns to the process shown in FIG. 3.

In step S4002, the system controller 50 judges whether it has displayed the edited images in multiscreen form in step S3012. If the system controller 50 has judged that it has not displayed the edited images in multiscreen form in step S3012, that is, if the system controller 50 has judged that it has displayed the single image, the system controller 50 proceeds to step S4004.

In step S4004, the system controller 50 determines the presently displayed image as an image to be printed, and stores identification information of the image in the memory 52 or the storage medium 200. The system controller 50 displays a print setting screen (not shown) on the image display unit 28.

In step S4007, various print settings are configured such that the user uses the operating unit 70, while viewing the print setting screen. The print setting screen is used to set, for example, a sheet size, a sheet type, the number of copies to be printed, selection between margin printing and marginless printing, etc. The system controller 50 stores various print settings in the memory 52 or the storage medium 200 on the basis of a user's selective operation.

In step S4008, the system controller 50 judges whether the determination button 302 has been pressed by the user. If, in step S4008, the system controller 50 has judged that the determination button 302 has been pressed, the system controller 50 proceeds to step S4009. If the system controller 50 has judged that the determination button 302 has not been pressed, step S4008 is repeated until the system controller 50 determines that the determination button 302 has been pressed.

In step S4009, the system controller 50 reads the image determined to be printed from the storage medium 200, and transfers the read image and corresponding print settings to a connected printer via the connector 112 before the printing finishes. The printer executes printing based on the received image and print settings.

Next, a case in which the system controller 50 has determined in step S4002 that it has displayed the images in multiscreen form is described below. In this case, the system controller 50 proceeds to step s4010.

Figure 13:
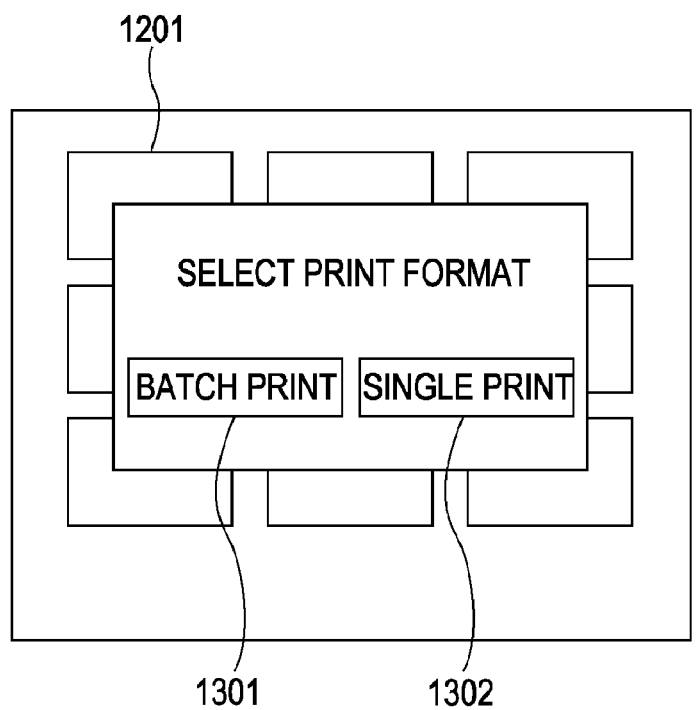
FIG. 13 is an illustration of an example of a print format setting screen in the first embodiment.

In step S4010, the system controller 50 displays a print format setting screen on the image display unit 28. An example of the print format setting screen is shown in FIG. 13. The print format setting screen includes a batch print button 1301 for instructing the printer to print images displayed in multiscreen form in a batch print manner. The print format setting screen also includes a single print button 1302 for instructing the printer to print images one by one.

In step S4003, the system controller 50 determines whether the batch print button 1301 on the print format setting screen has been selected by the user. If the system controller 50 has determined that the batch print button 1301 on the print format setting screen has been selected, the system controller 50 proceeds to step S4005.

In step S4005, the system controller 50 determines all the images displayed in multiscreen form as images to be printed, and proceeds to step S4007.

Steps S4007 to S4009 are similar to those in the case of displaying the single image. In step S4009, all the images determined as the images to be printed are printed.

If, in step S4003, the system controller 50 has judged that the batch print button 1301 has not been selected, that is, if it is judged that the single print button 1302 has been selected, the system controller 50 proceeds to step S4006.

Figure 14:
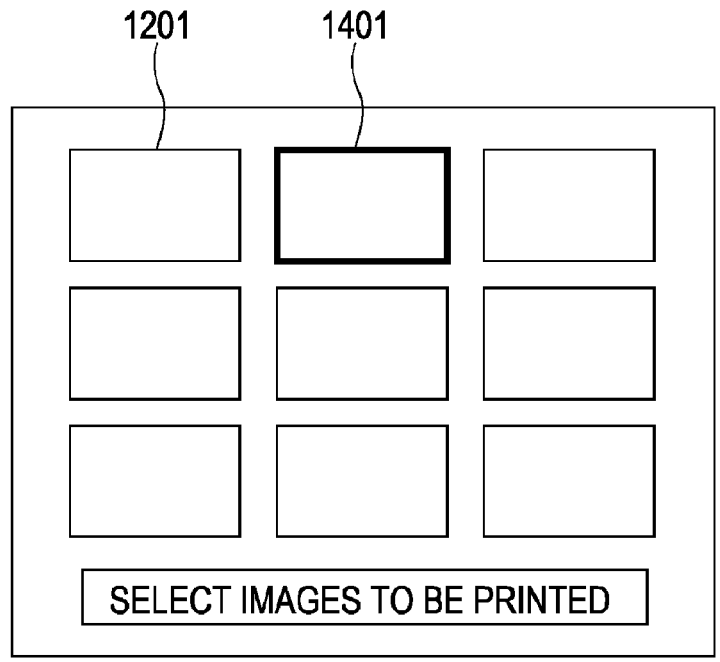
FIG. 14 is an illustration of edited image display in multi-screen form in the first embodiment.

In step S4006, the system controller 50 displays a print image selecting screen on the image display unit 28. An example of the print image selecting screen is shown in FIG. 14.

The user selects an image to be printed while viewing the print image selecting screen. The selected image is displayed in the bold line frame shown in FIG. 14, as indicated by an image 1401.

The system controller 50 determines the image selected by the user on the print image selecting screen as an image to be printed, and proceeds to step S4007.

Steps S4007 to S4009 are similar to those in the case of displaying the single image.

Figure 15:
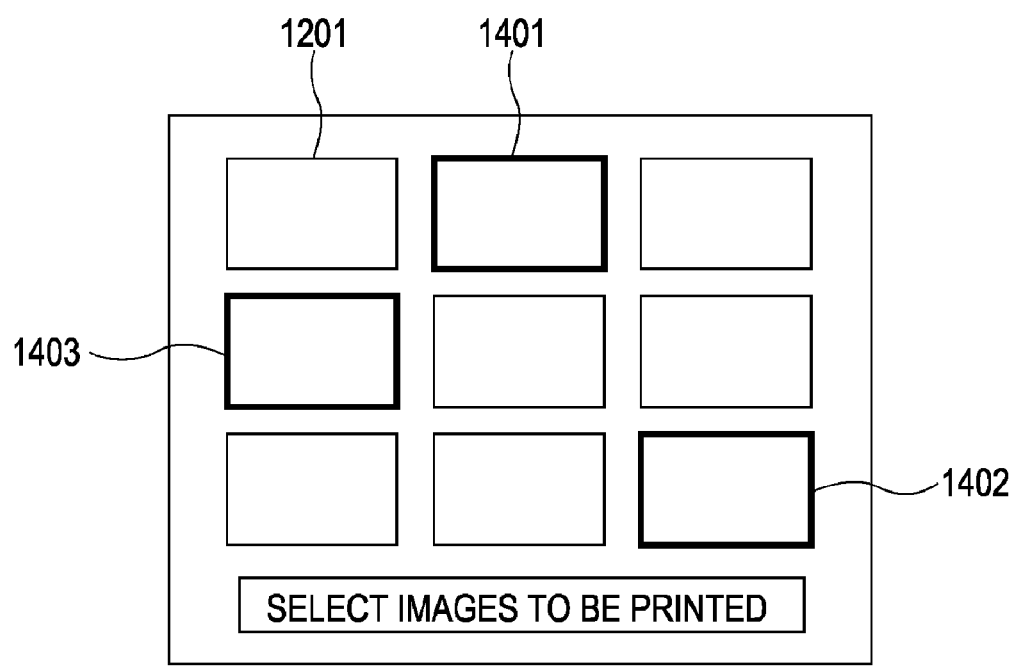
FIG. 15 is an illustration of edited image display in multi-screen form in the first embodiment.

Although the print image selecting screen is designed so that one image to be printed is selected, as shown in FIG. 15, an arbitrary number of images to be printed can be selected. In FIG. 15, images 1401, 1402, and 1403 are selected as images to be printed.

For determining an image or images to be printed, and configuring various print settings, a DPOF (Digital Print Order Format) file may be used.

In this embodiment, when the image editing mode finishes, the user can select between specifying an image prior to image editing after image editing and specifying of an edited image.

Accordingly, if the user selects the specifying image prior to image editing, the screen can be prevented from jumping to an edited image as soon as the image editing mode finishes.

Alternatively, if the user selects specifying of the edited image, when the user performs some processing, on the edited image, for example, the user performs printing, the need of a complicated operation of searching for the edited image is eliminated.

In addition, when a plurality of images are edited by using the image editing mode, by displaying the edited images in multiscreen form, the user can see the edited images at one view. In the case of displaying images in multiscreen form, by enabling batch print, the user can print a plurality of edited images by performing a simple operation.

Second Embodiment

A second embodiment of the present invention is now described.

In the first embodiment, the display image selecting screen shown in FIG. 10 is displayed when the image editing mode finishes.

The second embodiment is configured to display the display image selecting screen during the image editing mode, whereby a user's operation in the case of repeatedly performing editing is facilitated.

Portions that are characteristic in the second embodiment are described below without describing portions similar to those in the first embodiment.

Figure 5:
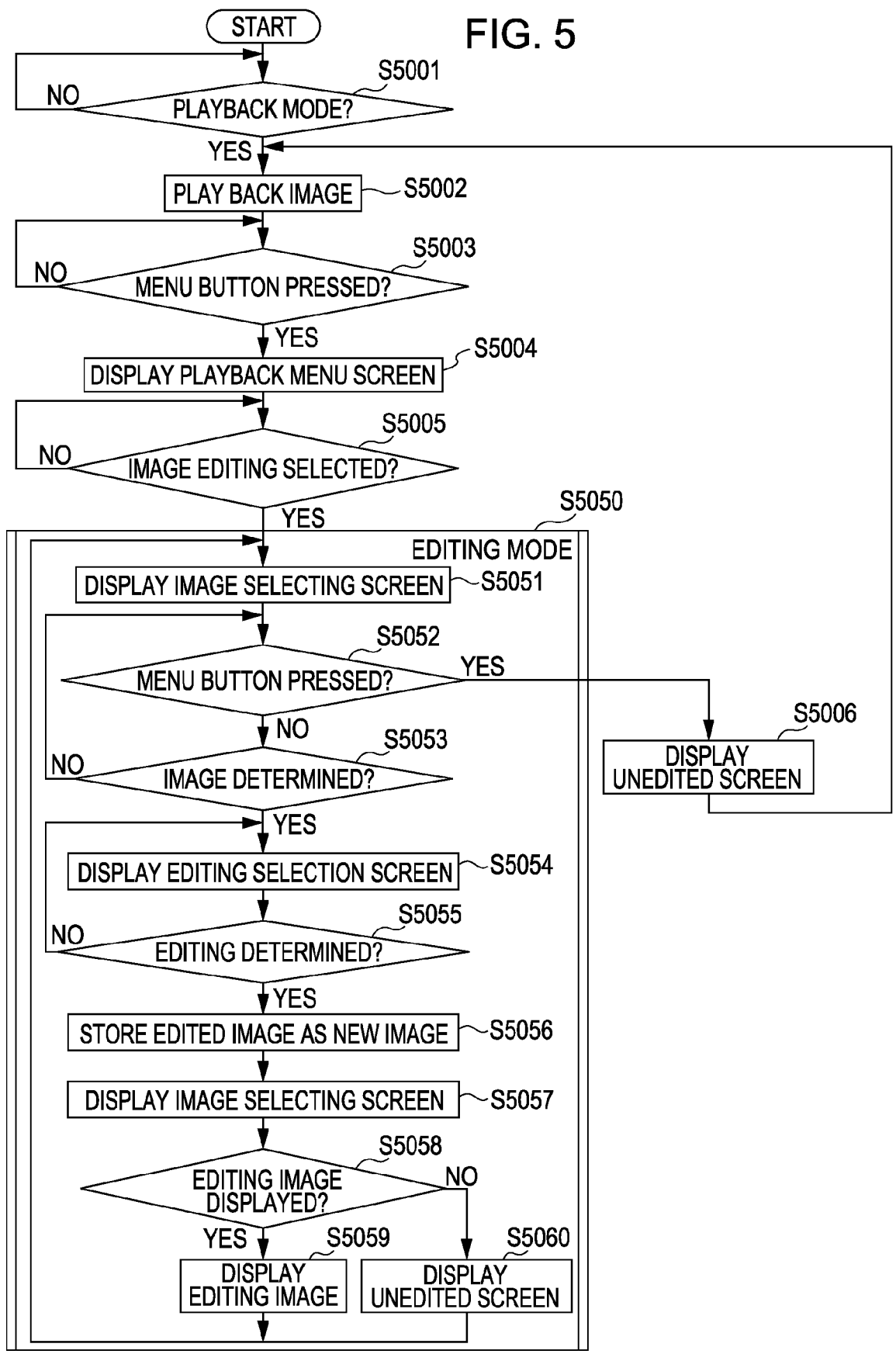
FIG. 5 is a flowchart showing a process in a second embodiment of the present invention that includes image editing, and image (to be displayed) selection after an image editing mode finishes.

FIG. 5 is a flowchart showing an image editing and display process in the second embodiment.

Steps S5001 to S5005 and S5051 to S5056 in the flowchart shown in FIG. 5 are not described here since steps S5001 to S5005 are similar to steps S3001 to S3005 in FIG. 3 and steps S5051 to S5056 are similar to steps S3051 to S3056 in FIG. 3.

Step S5057 and the subsequent steps are described below.

In step S5057, the system controller 50 displays the display image selecting screen shown in FIG. 10 on the image display unit 28.

In step S5058, the system controller 50 judges whether display of an edited image has been selected by the user. Specifically, processing corresponding to step S3008 in the first embodiment is performed. If the system controller 50 has judged that display of the edited image has been selected, the system controller 50 proceeds to step S5059.

In step S5059, the system controller 50 displays the edited image. When the direction button 305 or 306 is pressed with the edited image displayed, image feeding is initiated in order from the edited image.

If, in step S5058, the system controller 50 has judged that display of the edited image has not been selected, that is, if it is judged that display of an unedited image prior to editing has been selected, the system controller 50 proceeds to step S5060.

In step S5060, the system controller 50 specifies and displays the unedited image prior to editing on the image display unit 28. When the direction button 305 or 306 is pressed with the unedited image displayed, image feeding is initiated in order from the unedited image.

If, in step S5052, the system controller 50 has judged that the menu button 301 has been pressed, the system controller 50 proceeds to step S5006.

In step S5006, the system controller 50 specifies and displays an unedited image on the image display unit 28, and returns to step S5002.

The process in the second embodiment has now been described. This process is illustrated below by using a specific example.

Figure 16:
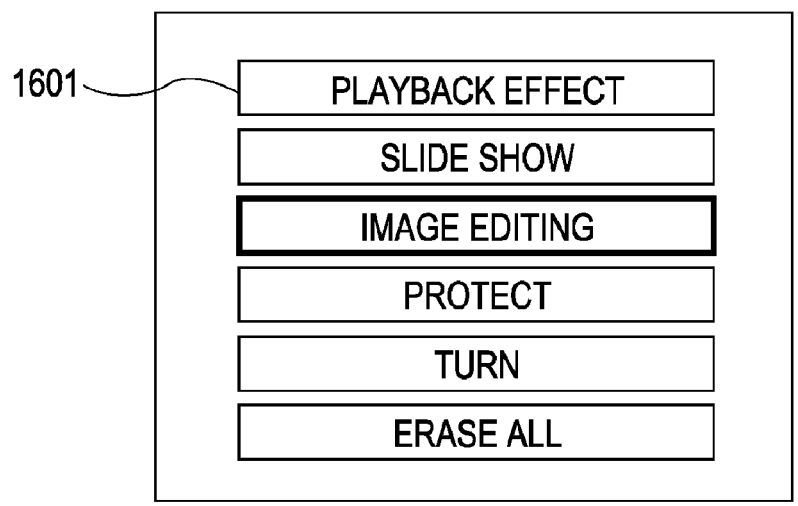
FIG. 16 is an illustration of an example of a menu screen in the second embodiment.

FIG. 16 shows a playback menu screen displayed in step S5004. In step S5005, "image editing" 1601 is selected by the user, whereby the image editing mode is activated.

Figure 17:
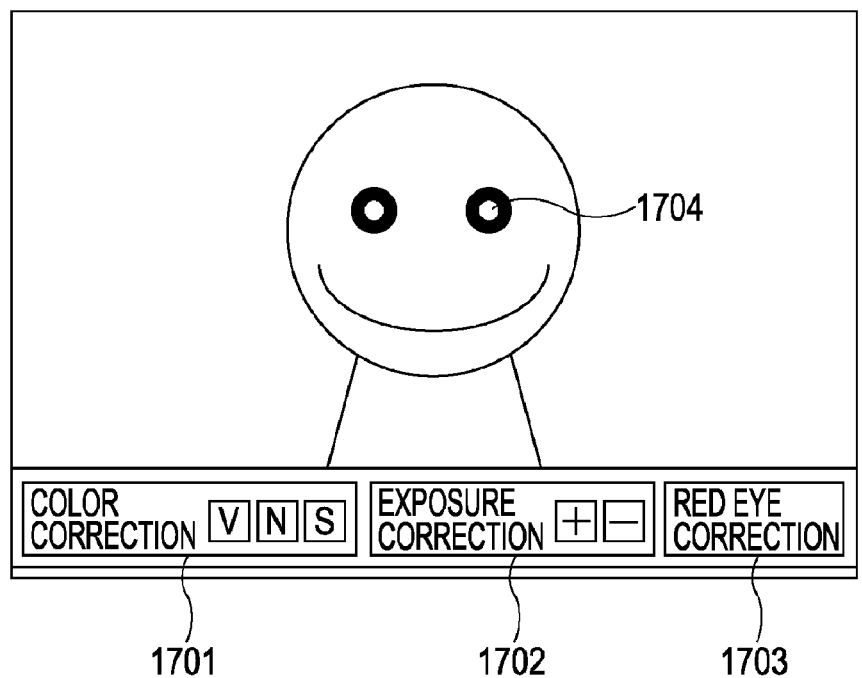
FIG. 17 is an illustration of an example of an editing selection screen in the second embodiment.

After the display image selecting screen is displayed (S5051), by selecting an image to be edited (S5053), the editing selection screen shown in FIG. 17 is displayed. The editing selection screen includes color processing icons 1701 for specifying various types of color processing, exposure correcting icons 1702 for specifying exposure correction, and a red eye processing icon 1703 specifying red eye processing. The image shown in FIG. 17 includes portions 1704 as red eyes.

When the red eye processing icon 1703 is selected by the user (S5055), red eye processing is performed and the edited image is stored (S5056).

Figure 18:
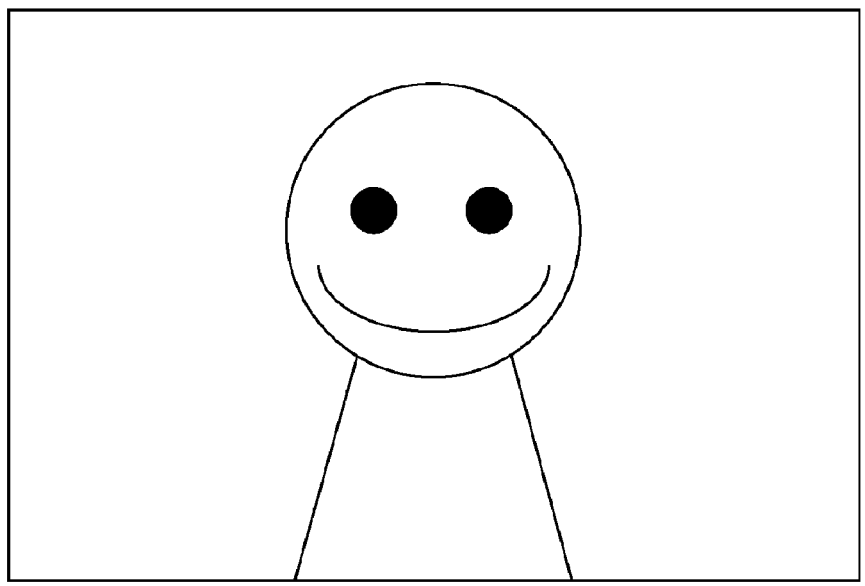
FIG. 18 is an illustration of an example of an edited image in the second embodiment.

After the image editing, the display image selecting screen shown in FIG. 10 is displayed (S5055). By selecting the "yes" button 1001 ("YES" in step S5058), the edited image is specified. As a result, the edited image is displayed (S5059) on the display image selecting screen. The edited image obtained by performing the red eye processing is shown in FIG. 18.

After that, the last edited and stored image is displayed on the display image selecting screen (S5051). Accordingly, the user can display the edited image without performing a complicated operation of searching for the edited image again (S5053).

Figure 19:
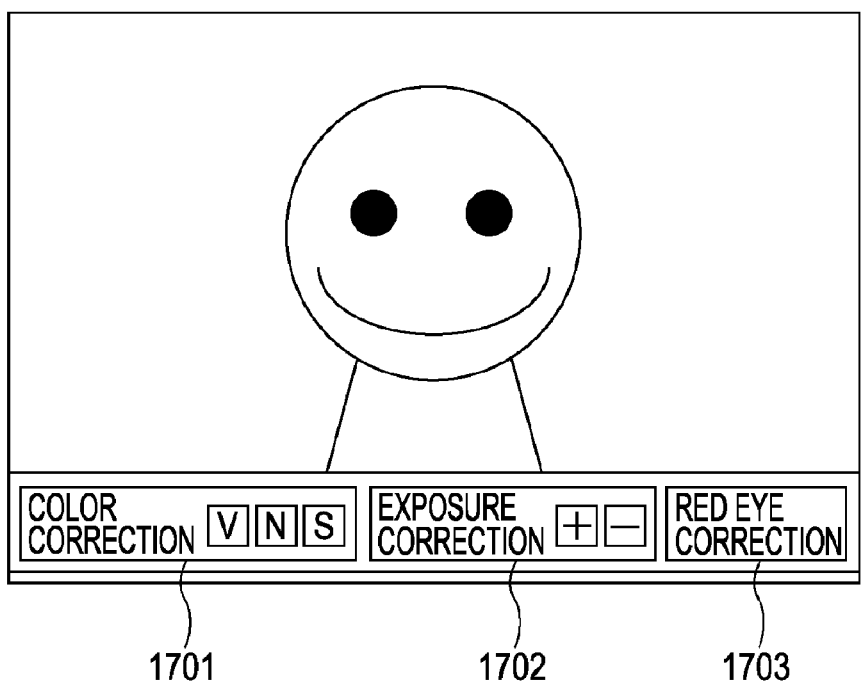
FIG. 19 is an illustration of an example of an edited image in the second embodiment.

The user can select the edited image and can select a new type of editing on the editing selecting screen shown in FIG. 19 (S5005).

Figure 20:
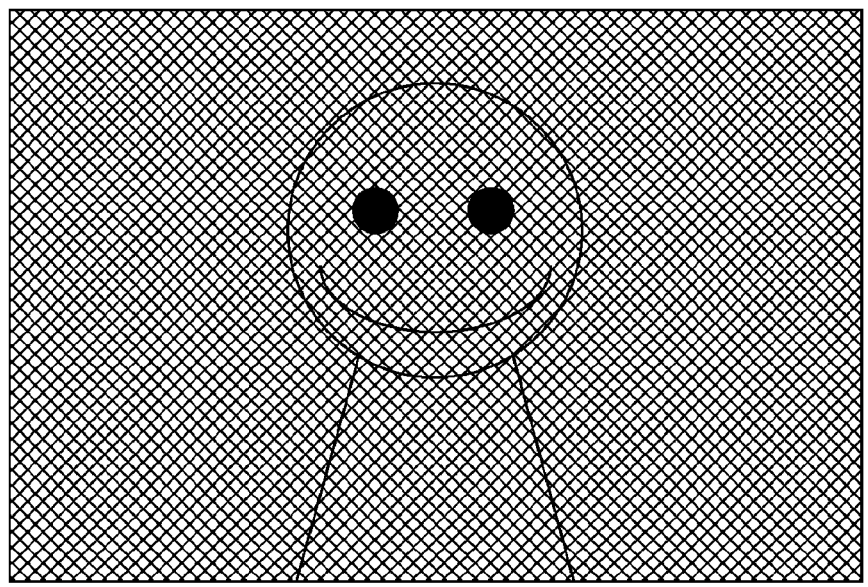
FIG. 20 is an illustration of an example of an edited image in the second embodiment.

FIG. 20 shows an image obtained when the color processing "sepia" is further selected. The above processing allows the user to obtain an image having results of both the red eye processing and the color processing.

In the second embodiment, the display image selecting screen can be displayed when an image is edited. This makes it possible to repeatedly perform image processing without finishing the image editing mode. According to the present invention, regarding image viewing after performing image editing, the user can fast view images that match a user's intention without needing any effort.

Other Embodiments

An embodiment of the present invention relates to selection of an image specified after an image processed in some manner is stored. Accordingly, types of image processing are not limited to those described in the embodiments. Obviously, the present invention is effective for various types of image editing such as a mode for correcting red eyes caused by color correction and strobe light emission, exposure, correction for image stabilization, and image trimming.

Regarding processing of the above-described embodiments, a storage medium storing program code of software embodying functions of the embodiments may be provided to a system or an apparatus. A computer (or a CPU (central processing unit) or MPU (microprocessor unit) in the system or apparatus reads and executes the program code stored in the storage medium, whereby the functions of the embodiments can be realized. In this case, the program code read from the storage medium, itself, realizes the functions of the embodiments. Accordingly, the storage medium storing the program code is included in the storage medium. Types of storage medium may include, for example, a floppy disk, a hard disk, an optical disc, and a magneto-optical disc. Instead, the types of the storage medium may include a CD-ROM (compact-disc read-only memory), a CD-R (compact disc recordable), a magnetic tape, a nonvolatile memory card, and a ROM.

In addition, by executing the program code read from the computer, the functions of the embodiments are realized. The present invention includes a case in which, on the basis of instructions of the program code, an OS (operating system) running on the computer performs all or part of actual processing, whereby the processing realizes the functions of the embodiments.

Furthermore, the program code read from the storage medium may be written in a memory provided in a function expansion board or a function expansion unit connected to the computer. After that, the present invention includes a case in which a CPU or the like provided on the function expansion board or the function expansion unit performs all or part of actual processing on the basis of instructions of the program code, whereby the processing realizes the functions of the embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-034966 filed Feb. 13, 2006, and No. 2007-004675 filed Jan. 12, 2007, which are hereby incorporated by reference in their entirety.

What is claimed is:

1. A digital camera comprising:
    an image pickup unit configured to capture an image of an object;
    a first storage control unit configured to store the image captured by the image pickup unit in a storage device;
    an image display unit configured to display an image among stored images in the storage device;
    an editing unit configured to create an edited image, in an editing mode, by editing an original image stored in the storage device through image modification of the original image;
    a second storage control unit configured to store the edited image in the storage device;
    a designation unit configured to sequentially designate the images including the original image and the edited image in accordance with an instruction from a user, the original image and the edited image being stored in the storage device; and
    a selecting screen display unit configured to display a selecting screen for selecting, after editing is performed, which image to be designated in the sequential designation by the designation unit from the edited image and the original image,
    wherein the sequential designation starts with the edited image in a case where the edited image is selected on the selecting screen, and the sequential designation starts with the original image in a case where the original image is selected on the selecting screen.

2. The digital camera according to claim 1, wherein:
    the digital camera has an editing mode for performing image editing by the editing unit; and
    when the editing mode finishes, the selecting screen display unit displays the selecting screen.

3. The digital camera according to claim 2, further comprising a print instructing unit configured to issue an instruction to print the image displayed on the basis of the selection.

4. The digital camera according to claim 2, further comprising a multiscreen image display unit configured to perform multiscreen form image display,
    wherein, the editing unit is capable of editing a plurality of images in the editing mode; and
    wherein, when it is selected that the edited image is to be displayed on the selecting screen, the multiscreen image display unit performs image display in multiscreen form in which a plurality of reduced images corresponding to the images edited in the editing mode are displayed on a single screen.

5. The digital camera according to claim 1, wherein, in response to the editing unit edits the image, the selecting screen display unit displays the selecting screen.

6. The digital camera according to claim 1, wherein the editing performed by the editing unit includes one of red eye processing, color correction, an image turn, exposure correction, and image trimming.

7. The digital camera according to claim 2, further comprising:
    a judging unit configured to judge, when the editing mode finishes, whether there exists an image edited in the editing mode or not,
    wherein the selecting screen display unit displays the selecting screen in a case where the judging unit judged that there exists an image edited in the editing mode, and does not display the selecting screen in a case where the judging unit judged that there exists no image edited in the editing mode.

8. The digital camera according to claim 7, wherein the judging unit judges whether there exists an image edited in the editing mode or not by comparing the number of the images stored in the storage device when starting the editing mode and the number of the images stored in the storage device when completing the editing mode.

9. A method for controlling an image pickup apparatus, the method comprising:
    picking up an image of an object;
    storing the image in a storage device;
    displaying an image among stored images in the storage device;
    creating an edited image, in an editing mode, by editing an original image stored in the storage device through image modification of the original image;
    storing the edited image in the storage device;
    sequentially designating the images including the original image and the edited image in accordance with an instruction from a user, the original image and the edited image being stored in the storage device; and
    displaying a selecting screen for selecting, after editing is performed, which image to be designated in the sequential designation from the edited image and the original image,
    wherein the sequential designation starts with the edited image in a case where the edited image is selected on the selecting screen, and the sequential designation starts with the original image in a case where the original image is selected on the selecting screen.

10. A non-transitory computer-readable storage medium storing computer-executable process steps, the computer-executable process steps executing the method of claim 9.

* * * * *